(12) United States Patent
Miyamoto

(10) Patent No.: US 9,141,190 B2
(45) Date of Patent: Sep. 22, 2015

(54) INFORMATION PROCESSING APPARATUS AND INFORMATION PROCESSING SYSTEM

(75) Inventor: Kohei Miyamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 817 days.

(21) Appl. No.: 13/305,013

(22) Filed: Nov. 28, 2011

(65) Prior Publication Data

US 2012/0144312 A1 Jun. 7, 2012

(30) Foreign Application Priority Data

Dec. 7, 2010 (JP) ................ P2010-272367

(51) Int. Cl.
  *G06F 3/01* (2006.01)
  *G06F 3/048* (2013.01)

(52) U.S. Cl.
  CPC ............... *G06F 3/013* (2013.01); *G06F 3/048* (2013.01)

(58) Field of Classification Search
  USPC .................................... 715/708, 738
  See application file for complete search history.

(56) References Cited

U.S. PATENT DOCUMENTS

| | | | | |
|---|---|---|---|---|
| 5,886,683 | A * | 3/1999 | Tognazzini et al. | 715/700 |
| 8,599,133 | B2 * | 12/2013 | Lashina et al. | 345/158 |
| 8,797,261 | B2 * | 8/2014 | Yuan | 345/156 |
| 2009/0125559 | A1 | 5/2009 | Yoshino | |

FOREIGN PATENT DOCUMENTS

| | | |
|---|---|---|
| JP | 2007-006111 A | 1/2007 |
| JP | 2009-117974 A | 5/2009 |

* cited by examiner

*Primary Examiner* — Thanh Vu
(74) *Attorney, Agent, or Firm* — Hazuki International, LLC

(57) ABSTRACT

An information processing apparatus is disclosed which includes: a discrimination section configured to discriminate an object drawing the line of sight of a user viewing an image displayed on a display screen, the discrimination being based both on coordinate information indicative of where the line of sight of the user is positioned relative to the image and on object information including area information indicative of an image area including the object in the image; and a processing section configured such that when the discrimination section discriminates the object drawing the line of sight of the user, the processing section selectively performs a process corresponding to the object discriminated by the discrimination section.

15 Claims, 8 Drawing Sheets

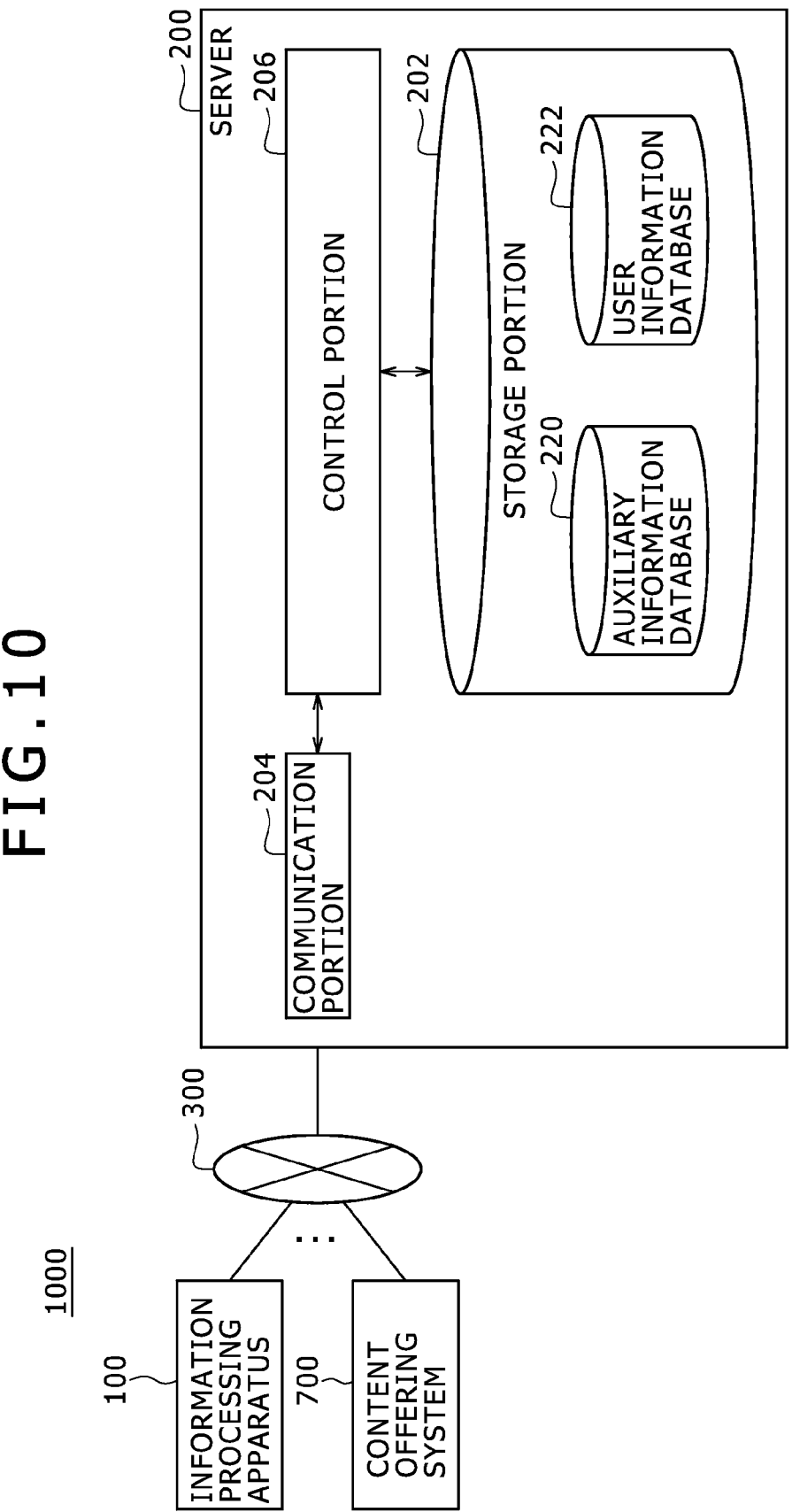

INFORMATION PROCESSING APPARATUS AND INFORMATION PROCESSING SYSTEM

CROSS-REFERENCE TO RELATED APPLICATION

The present application claims priority from Japanese Patent Application No. JP 2010-272367 filed in the Japanese Patent Office on Dec. 7, 2010, the entire content of which is incorporated herein by reference.

BACKGROUND

The present disclosure relates to an information processing apparatus and an information processing system.

Recent years have witnessed the development of techniques for using, on a display screen, an area that draws (or is expected to draw) the attention of the user viewing an image displayed on that screen. One such technique, disclosed in Japanese Patent Laid-Open No. 2007-006111 (called the Patent Document 1 hereunder) for example, involves detecting an attention-drawing object in an image based on reference data (metadata) and trimming the image into a trimmed image in such a manner that the trimming coordinates established on the basis of the coordinates of the detected attention-drawing object determine the center of the trimmed image. Another technique, disclosed in Japanese Patent Laid-Open No. 2009-117974 (called the Patent Document 2 hereunder) for example, involves recording, to a database, interest information based on information about those areas of content designated by users so that analyzers using the database may create information indicative of the trend of the users' interest.

SUMMARY

The apparatus to which the technique described in the Patent Document 1 is applied (the apparatus may be referred to as the ordinary apparatus 1 and the technique as the ordinary technique 1 hereunder where appropriate) detects the attention-drawing object based on the reference data input from the outside. However, because the attention-drawing object detected by the ordinary apparatus 1 is based on the externally input reference data, the detected attention-drawing object may or may not actually draw the attention of the user viewing the image (moving or still image; ditto hereunder). And as mentioned above, the ordinary apparatus 1 trims the image in such a manner that the trimming coordinates established on the basis of the coordinates of the detected attention-drawing object determine the center of the trimmed image. That means the trimmed image created by the ordinary apparatus 1 can turn out to be an image with its center occupied by an object not actually drawing the user's attention. Furthermore, the trimmed image can exclude the object that was included in the original image and that may have drawn the user's attention. For these reasons, it is not quite certain that using the ordinary technique 1 makes it possible to discriminate the object drawing the attention of the user viewing the image of interest and to perform a relevant process corresponding to the discriminated object.

The apparatus to which the technique described in the Patent Document 2 is applied (the apparatus may be referred to as the ordinary apparatus 2 and the technique as the ordinary technique 2 hereunder where appropriate) records, to a database, the interest information based on information about those areas of content designated by users. Because the interest information is based on the information about those area of content designated by the user according to the ordinary technique 2, there is a possibility that the information indicative of the trend of the users' interest can indeed be created using the database that stores the interest information according to the ordinary technique 2. With the ordinary apparatus 2, however, the interest information cannot be recorded to the database unless the users manually designate the areas they are interested in. That is, the ordinary technique 2 presupposes that operations are performed intentionally by the users. That means the use of the ordinary technique 2 can entail reduced convenience for the users. Since the ordinary technique 2 presupposes the users' intentional operations, what is recorded to the database may include interest information about the areas selected more or less arbitrarily for one reason or another by users who are not quite interested in those areas. Thus it is not quite certain that using the ordinary technique 2 makes it possible to discriminate the object or objects drawing the attention of the users viewing the image of interest and to perform a relevant process corresponding to the discriminated objects.

As described above, even if the ordinary technique 1 or 2 (generically called the ordinary technique hereunder where appropriate) is utilized, it is not quite certain that the object drawing the attention of the user or users viewing the image of interest can be discriminated and subjected to relevant processing.

The present disclosure has been made in view of the above circumstances and provides an information processing apparatus and an information processing system improved to discriminate the object drawing the attention of the user viewing the image of interest displayed on a screen and to perform a relevant process corresponding to the discriminated object.

According to one embodiment of the present disclosure, there is provided an information processing apparatus including: a discrimination section configured to discriminate an object drawing the line of sight of a user viewing an image displayed on a display screen, the discrimination being based both on coordinate information indicative of where the line of sight of the user is positioned relative to the image and on object information including area information indicative of an image area including the object in the image; and a processing section configured such that when the discrimination section discriminates the object drawing the line of sight of the user, the processing section selectively performs a process corresponding to the object discriminated by the discrimination section.

The structure outlined above permits discrimination of the object drawing the attention of the user viewing the image displayed on the display screen, so as to carry out the process corresponding to the discriminated object.

Preferably, the information processing apparatus may further include a detection section configured to detect the object included in the image so as to generate the object information, by utilizing metadata associated with the image and/or by processing the image; wherein the discrimination section may determine the object drawing the line of sight of the user based on the object information generated by the detection section.

Preferably, the processing section may provide a display of what is indicated by auxiliary information about the object discriminated by the discrimination section, the display being positioned near the image area corresponding to the object discriminated by the discrimination section.

Preferably, the information processing apparatus may further include: a storage portion; and a communication portion configured to communicate with an external apparatus storing the auxiliary information; wherein the processing section may generate attention-drawing object information indicative of the object discriminated by the discrimination section, before recording the generated attention-drawing object information to the storage portion; if the attention-drawing object information corresponding to the object discriminated by the discrimination section is stored in the storage portion, then the processing section may acquire the auxiliary information corresponding to the attention-drawing object information from the external apparatus via the communication portion; and the processing section may display what is indicated by the acquired auxiliary information near the image area which is part of the image and which corresponds to the object discriminated by the discrimination section.

Preferably, the information processing apparatus may further include a communication portion configured to communicate with an external apparatus; wherein the processing section may generate attention-drawing object information indicative of the object discriminated by the discrimination section, before causing the communication portion to transmit the generated attention-drawing object information to the external apparatus.

Preferably, the processing section may perform an expansion process for expanding the image area corresponding to the object discriminated by the discrimination section, and/or an extended definition process for enhancing image quality of the image area.

Preferably, the processing section may prevent any image different from the image and/or what is indicated by any information unrelated to the image from being displayed in superposed fashion on the image area corresponding to the object discriminated by the discrimination section.

Preferably, the information processing apparatus may further include an input portion configured to admit the coordinate information generated by and input from an imaging device through detection of the line of sight of the user relative to the image displayed on the display screen of a display device; wherein, based on the coordinate information input to the input portion, the discrimination section may discriminate the object drawing the line of sight of the user.

Preferably, the information processing apparatus may further include: a display portion configured to display the image on the display screen; and an imaging portion configured to generate the coordinate information by detecting the line of sight of the user relative to the image displayed on the display screen of the display portion; wherein, based on the coordinate information generated by the imaging portion, the discrimination section may discriminate the object drawing the line of sight of the user.

According to another embodiment of the present disclosure, there is provided an information processing system including: a server configured to store auxiliary information about an object; and an information processing apparatus configured to communicate with the server. The information processing apparatus includes: a storage portion; a communication portion configured to communicate with the server; a discrimination section configured to discriminate an object drawing the line of sight of a user viewing an image displayed on a display screen, the discrimination being based both on coordinate information indicative of where the line of sight of the user is positioned relative to the image and on object information including area information indicative of an image area including the object in the image; and a processing section configured such that when the discrimination section discriminates the object drawing the line of sight of the user, the processing section selectively performs a process corresponding to the object discriminated by the discrimination section. The processing section generates attention-drawing object information indicative of the object discriminated by the discrimination section, before recording the generated attention-drawing object information to the storage portion. If the attention-drawing object information corresponding to the object discriminated by the discrimination section is stored in the storage portion, then the processing section acquires the auxiliary information corresponding to the attention-drawing object information from the server via the communication portion. The processing section displays what is indicated by the acquired auxiliary information near the image area corresponding to the object discriminated by the discrimination section.

The structure outlined above constitutes an information processing system capable of discriminating the object drawing the attention of the user viewing the image displayed on the display screen, so as to carry out the process corresponding to the discriminated object.

According to a further embodiment of the present disclosure, there is provided an information processing system including: a server; and an information processing apparatus configured to communicate with the server The information processing apparatus includes: a communication portion configured to communicate with the server; a discrimination section configured to discriminate an object drawing the line of sight of a user viewing an image displayed on a display screen, the discrimination being based both on coordinate information indicative of where the line of sight of the user is positioned relative to the image and on object information including area information indicative of an image area including the object in the image; and a processing section configured such that when the discrimination section discriminates the object drawing the line of sight of the user, the processing section selectively performs a process corresponding to the object discriminated by the discrimination section. The processing section generates attention-drawing object information indicative of the object discriminated by the discrimination section, before causing the communication portion to transmit the generated attention-drawing object information to the server.

The structure outlined above also constitutes an information processing system capable of discriminating the object drawing the attention of the user viewing the image displayed on the display screen, so as to carry out the process corresponding to the discriminated object.

According to the present disclosure, it is thus possible to discriminate the object drawing the attention of the user viewing the image displayed on the display screen and to carry out the process corresponding to the discriminated object.

BRIEF DESCRIPTION OF THE DRAWINGS

FIG. 10 is a block diagram showing a typical structure of a server embodying the present disclosure.

DETAILED DESCRIPTION OF THE PREFERRED EMBODIMENTS

Figure 1:
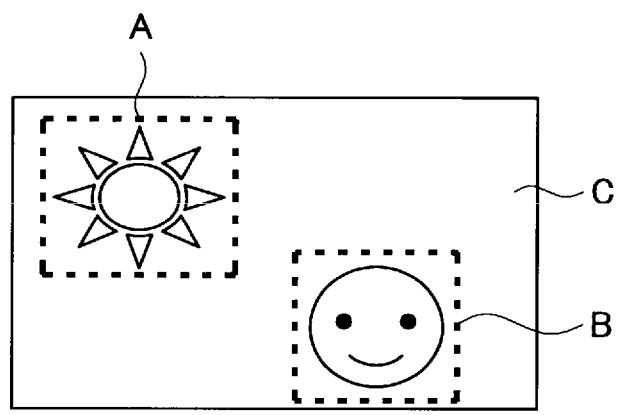
FIG. 1 is an explanatory view showing a typical image as well as typical image areas for use when the present disclosure is embodied.

Some preferred embodiments of the present disclosure will now be described in detail with reference to the accompanying drawings. Throughout the ensuing description and the attached drawings, like reference numerals designate like or functionally equivalent components, and their explanations may be omitted where redundant.

The ensuing description will be given under the following headings:

1. An approach to the preferred embodiments of the present disclosure;
2. Server, and information processing apparatus embodying the present disclosure; and
3. Programs embodying the present disclosure.

(An Approach to the Preferred Embodiments of the Present Disclosure)

A processing approach to the preferred embodiments will be explained first, followed by an explanation of a typical structure of an information processing apparatus (referred to as the information processing apparatus 100 hereunder) embodying the present disclosure.

[Outline of the Processing Approach to the Preferred Embodiments]

As discussed above, where an object is detected based on externally input reference data as with the ordinary technique 1, it is not quite certain that the detected object is an object that can draw the attention of the user. Where the object drawing the attention of users is discriminated on the assumption that the users perform operations intentionally as with the ordinary technique 2, the process can entail reduced convenience for the users. Since the ordinary technique 2 presupposes the users' intentional operations, the object may be discriminated more or less arbitrarily by the users who are not quite interested in the object. Thus it is not quite certain that using the ordinary technique 2 makes it possible to discriminate the object drawing the attention of the users viewing the image displayed on the display screen.

The information processing apparatus 100 thus discriminates the object drawing the line of sight of the user viewing an image displayed on a display screen, the discrimination being based both on coordinate information indicative of where the line of sight of the user is positioned relative to the image and on object information including area information indicative of an image area including the object in the image.

For example, the display screen displaying the image in conjunction with the preferred embodiments may be the display screen of an external display device (display device 500, to be discussed later) or the display screen of a display portion (to be discussed later) attached to the information processing apparatus 100.

Furthermore, the coordinate information applicable to the preferred embodiments may be typically generated either by an external imaging device (e.g., imaging device 600, to be discussed later) for imaging in the display direction of the display screen on the display device 500, or by an imaging portion (to be discussed later) for imaging in the display direction of the display screen on a display portion (to be discussed later), the imaging portion being attached to the information processing apparatus 100. If the coordinate information is generated by the external imaging device, the information processing apparatus 100 uses the coordinate information sent from the external imaging device for processing; if the coordinate information is generated by the imaging portion, then the information processing apparatus 100 uses the coordinate information generated by the imaging portion for processing.

The coordinate information may be composed of coordinates expressed with their origin fixed to a specific position such as the top left corner of an image. For example, the external imaging device (or simply called the imaging device; ditto hereunder) may generate coordinate information by detecting the line of sight of a user through the use of the technique disclosed in Japanese Patent Laid-Open No. 2006-202181 filed by this applicant. Specifically, the external imaging device may generate coordinate information by detecting the user's line of sight based on the images taken by two imaging devices attached horizontally to the display screen of, say, an external display device (or simply called the display device; ditto hereunder). The external imaging device can also generate coordinate information by detecting the user's face from an image taken of him or her (called the taken image hereunder) and by estimating the attitude of the face and that of the eyeballs of the user so as to estimate the direction of the user's line of sight. More specifically, the external imaging device may detect the user's face by detecting feature points such as the user's eyes, nose, mouth, and skeletal outline; brightness distribution over the face, and facial areas similar to predetermined structural patterns, for example. With the user's face detected, the external imaging device may estimate the attitude of the face using, say, the technique of AAM (Active Appearance Model) and may also estimate the attitude of the eyeballs based on the positional relations of the irises within the eye areas detected from the taken image. The external imaging device may then synthesize the estimated attitude of the face and that of the eyeballs so as to estimate the direction of the user's line of sight, thereby generating the coordinate information corresponding to the estimated results. The above-outlined techniques are not limitative of the method for generating coordinate information as part of the embodiments of the present disclosure. For example, the external imaging device or imaging portion as part of the embodiments of this disclosure may generate coordinate information by detecting (or estimating) the user's line of sight from taken images using suitable eye-tracking techniques such as one disclosed in Japanese Patent Laid-Open No. 2009-59257 filed by this applicant.

FIG. 1 is an explanatory view showing a typical image as well as typical image areas for use when the present disclosure is embodied. FIG. 1 shows an image containing image areas A, B and C. In this example, the image areas A and B each include an object, and the image area C is an area other than the image areas A and B in the image. That is, the image area C is an area that does not include any object.

The area information applicable to the embodiments of the present disclosure is information indicative of image areas each including the object such as the image areas A and B. Where each image area is rectangular as shown in FIG. 1, the area information may designate the coordinates of, say, the top left corner and bottom right corner. The rectangular areas such as those shown in FIG. 1 are not limitative of the image areas applicable to the embodiments of the present disclosure. For example, the image areas relevant to the embodiments may be circular or elliptical. In the preceding example, the area information applicable to the embodiments of this disclosure may designate the coordinates of the center of each image area as well as its minor and major axes (the minor axis is equal to the major axis in the case of a circle).

The information processing apparatus 100 is capable of uniquely identifying the image area that does not include any object such as the image area C, through the use of the area information indicative of the image areas each including the object such as the image areas A and B. Obviously, the area information relevant to the embodiments of this disclosure is not limited to the information indicative of the image area including the object; the area information may also designate the image area that does not include any object.

The object information applicable to the embodiments of this disclosure constitutes data indicative of the object included in the image. As such, the object information may include area information for example. The object information may also include information identifying the object (e.g., information indicating the name and type of the object) and other object-related information (i.e., any information related to the object; called the auxiliary information hereunder). The information included in the object information is not limited to what was discussed above. For example, the object information may include information indicative of viewing points established for an object. The information processing apparatus 100 may transmit information indicative of such viewing points to a server (called the server 200 hereunder where appropriate) connected to the apparatus 100 directly or via a network (the transmission is a typical process corresponding to a discriminated object, as will be discussed later). The viewing points designated by the information sent from the information processing apparatus 100 may be used by the user 200 for calculating the viewing rate of each of the objects involved, for example.

The information processing apparatus 100 may acquire metadata corresponding to an image and generated by an external apparatus (e.g., apparatus owned by the creator (called the content provider hereunder where appropriate) having created the image displayed on the display screen), and may generate object information using the acquired metadata for example. In this case, the information processing apparatus 100 may acquire the metadata from an external display device having the image displayed on its display screen, or from the external apparatus (e.g., server 200, to be discussed later) connected directly or via a network for example. If the information processing apparatus 100 reproduces content data which constitutes the image and which is recorded on a recording medium such as Blu-ray (registered trademark) discs, the information processing apparatus 100 may acquire metadata from that recording medium.

Since the above-mentioned metadata may be generated typically by the content provider, the metadata can include object-identifying information and auxiliary information in addition to the area information. Thus by use of the acquired metadata, the information processing apparatus 100 can generate object information including at least area information.

The method for generating object information that may be adopted by the information processing apparatus 100 is not limited to what was described above. Alternatively, the information processing apparatus 100 may generate the object information by processing the image displayed on the display screen so as to detect images from that image and by establishing image areas based on the detected results. The above wording regarding the information processing apparatus 100 embodying the present disclosure in a manner "processing the image displayed on the display screen" may typically mean processing the image data or image signal corresponding to the image displayed on the display screen. Also, the image processed by the information processing apparatus 100 may be an image reproduced by an external display device and received by the information processing apparatus 100 or an image stemming from the content data reproduced by the information processing apparatus 100.

More specifically, the information processing apparatus 100 may use, say, local binary patterns to acquire feature quantities indicative of the contour of a target object included in the image and thereby calculate a histogram of the feature quantities applicable to the local binary patterns in a given area of the image so as to detect the object statistically. The information processing apparatus 100 may then establish the image area including the detected object and generate object information including area information. Obviously, the method for generating object information as part of the embodiments of the present disclosure is not limited to what was discussed above.

As explained above, based on the coordinate information and object information, the information processing apparatus 100 discriminates the object drawing the line of sight of the user. If an object is included in the image area drawing the line of sight of the user viewing the image displayed on the display screen, then it is highly likely that the user is paying attention to the object in question. On the other hand, if the object is not included in the image area drawing the line of sight of the user viewing the image on the display screen, then it is highly likely that the object drawing the user's attention does not exist within the image. Thus by discriminating the object drawing the user's line of sight, the information processing apparatus 100 can perform a process (to be discussed later) corresponding to the object drawing the user's attention in the image.

[Specific Examples of the Processes Relevant to the Processing Approach to the Embodiments of the Present Disclosure]

Explained below in more specific terms are some processes applicable to the processing approach to the embodiments of this disclosure. For example, the information processing apparatus 100 may implement the processing approach to the embodiments by carrying out processes (1) through (3), to be explained below.

(1) Object Information Generation Process

The information processing apparatus 100 may detect an object in an image by utilizing metadata corresponding to the image in question and/or by processing the image displayed on the display screen, for example. Also, the information processing apparatus 100 may generate object information about each object detected.

(2) Object Identification Process

The information processing apparatus 100 discriminates the object drawing the user's line of sight, based on the coordinate information generated by an external imaging device or an imaging portion and on the object information generated through the process (1) above (i.e., object information generation process).

Figure 2:
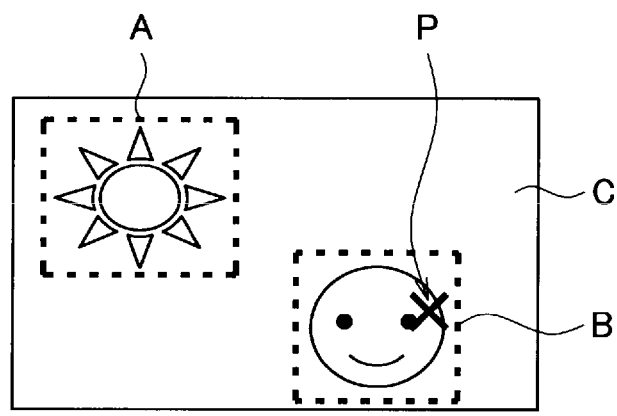
FIG. 2 is an explanatory view explaining a typical method for discriminating an object drawing the line of sight of a user, the method being used in conjunction with an information processing apparatus embodying the present disclosure.

FIG. 2 is an explanatory view explaining a typical method for discriminating the object drawing the user's line of sight, the method being used in conjunction with the information processing apparatus 100 embodying the present disclosure. FIG. 2 shows the same image as that in FIG. 1, the image in FIG. 2 also including the image areas A through C.

The information processing apparatus 100 may discriminate the object drawing the user's line of sight, typically on the basis of in which image area the coordinate point (e.g., P in FIG. 2) designated by coordinate information area is located. In the example of FIG. 2, the coordinate point designated by the coordinate information is positioned in the image area B (i.e., image area designated by the area information as part of the object information), so that the information processing apparatus 100 can conclude that the user's line of sight is drawn to the image area B. Thus in the example of FIG. 2, the information processing apparatus 100 can discriminate the object included in the image area B as the object drawing the user's line of sight.

The way the object is discriminated by the information processing apparatus 100 is not limited to, say, the method for determining what kind of object is drawing the user's line of sight. For example, the information processing apparatus 100 embodying the present disclosure may be arranged to discriminate the object by determining the image area including the object drawing the user's line of sight. More specifically, the information processing apparatus 100 may discriminate the image area including the object drawing the user's line of sight based on the area information as part of the object information. If information identifying the object is included in the object information, then the information processing apparatus 100 may further determine what kind of object is drawing the user's line of sight.

In the example of FIG. 2, there is shown one coordinate point (P in FIG. 2) designated by the coordinate information. This is an example in which the external imaging device or image portion has generated the coordinate information corresponding to one user's line of sight. However, the coordinates designated by the coordinate information used by the information processing apparatus 100 embodying this disclosure are not limited to one coordinate point. Alternatively, if the external imaging device or imaging portion has generated coordinate information corresponding to a plurality of users' lines of sight, i.e., if the coordinate information designates a plurality of coordinate points, then the information processing apparatus 100 may determine in which image area each of the coordinate points designated by the coordinate information exists, thereby discriminating the object drawing the line of sight of each of the users with regard to each coordinate point. In the ensuing description, the processing approach to the embodiments of the present disclosure will be explained on the assumption that a single coordinate point is designated by the coordinate information.

Also, if the coordinate point designated by the coordinate information remains for a predetermined time period within the image area corresponding to the same object, the information processing apparatus 100 may discriminate the object corresponding to the image area in question (or the image area itself) as the object drawing the user's line of sight. The above-mentioned time period may be defined in advance upon manufacture of the information processing apparatus 100 or established as desired by the user of the apparatus 100.

Figure 3:
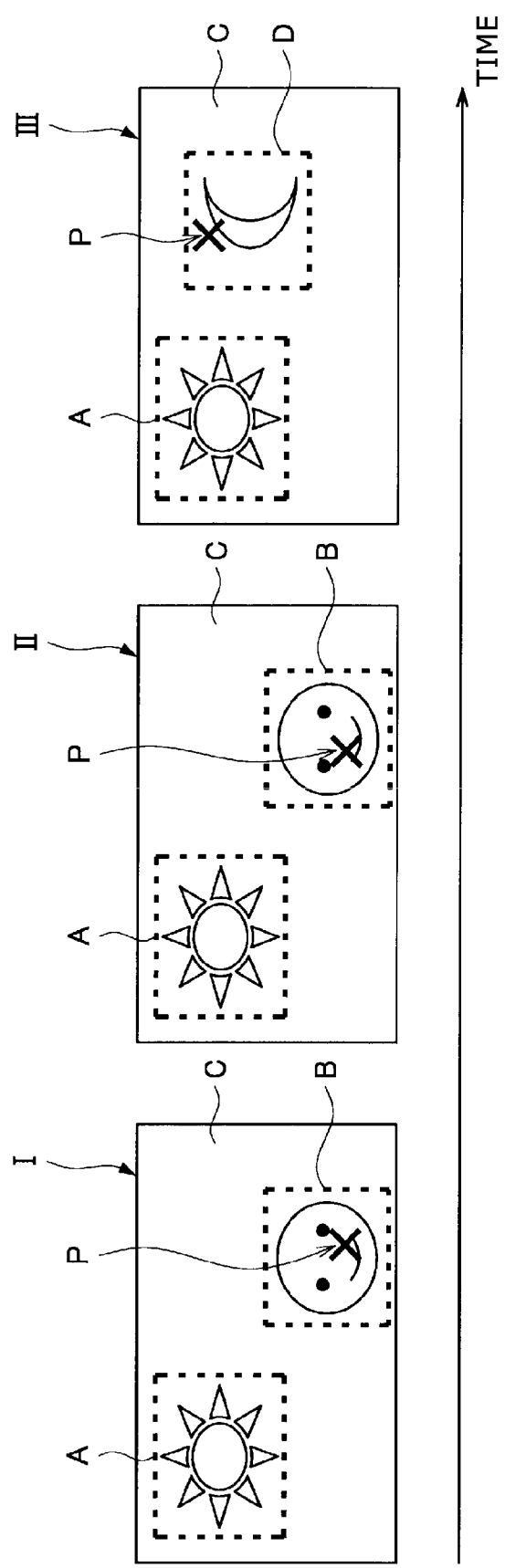
FIG. 3 is an explanatory view explaining a typical object identification process performed by the information processing apparatus embodying the present disclosure.
Figure 4:
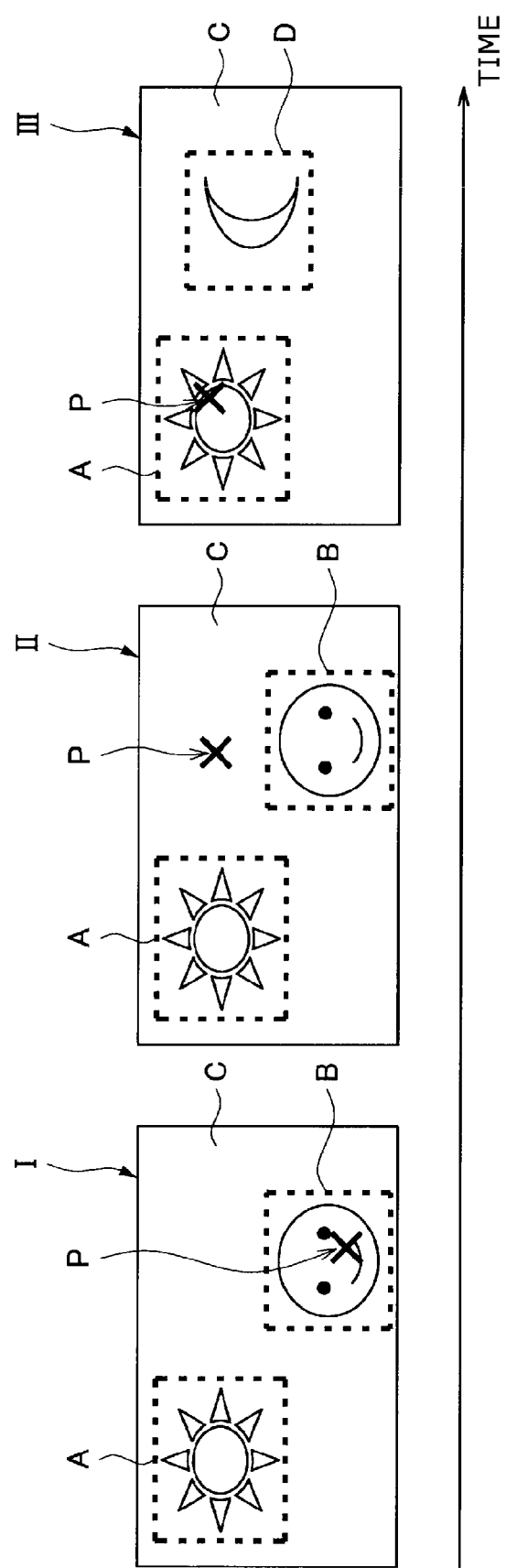
FIG. 4 is another explanatory view explaining the typical object identification process performed by the information processing apparatus embodying the present disclosure.

FIGS. 3 and 4 are explanatory views explaining a typical object identification process performed by the information processing apparatus 100 embodying the present disclosure. FIGS. 3 and 4 show examples in which the image displayed on the display screen is a moving image (or an aggregate of still images). Where the image displayed on the display screen is a still image, the process is still the same as in the case of the moving image.

In the example of FIG. 3, the coordinate point (P in FIG. 3) designated by the coordinate information is shown to exist in an image area B within two images I and II. Thus the information processing apparatus 100 discriminates the object included in the image area B (or the image area B itself) as the object drawing the user's line of sight.

In the example of FIG. 4, on the other hand, the coordinate point (P in FIG. 4) is not shown to exist in the same image area within each of images I, II and III. That is, in the case of FIG. 4, the user's line of sight does not remain in a specific image area so that it is not very likely that the user's attention is drawn to any specific object. In this case, the information processing apparatus 100 does not discriminate any object (or any image area) included in the image as the object drawing the user's line of sight.

As explained above, where the coordinate point designated by the coordinate information remains in the same image area for a predetermined time period, the information processing apparatus 100 may discriminate the coordinate point as the object drawing the user's line of sight. In this manner, the information processing apparatus 100 can discriminate the object (or image area) really drawing the user's attention as the object drawing the user's line of sight.

The processing by the information processing apparatus 100 is not limited to the process of discriminating a given object as the object drawing the user's line of sight if the coordinate point designated by the coordinate information remains for a predetermined time period within the image area corresponding to the same object. For example, the information processing apparatus 100 may determine in which image area the coordinate point designated by coordinate information exists every time the coordinate information is received. If the coordinate point designated by the coordinate information is found to exist in the image area designated by area information, then the information processing apparatus 100 may discriminate the object drawing the user's line of sight in that area. As another example, the information processing apparatus 100 may record results of the determination of in which image area the coordinate point designated by the coordinate information has existed as historical information of the user's line of sight.

(3) Execution Process

Based on the results of the discrimination in the process (2) above (object identification process), the information processing apparatus 100 selectively performs the process corresponding to the discriminated object. More specifically, when the object drawing the user's line of sight is discriminated by the process (2) above (object identification process), the information processing apparatus 100 carries out the process corresponding to the discriminated object; when such an object is not discriminated by the process (2), the information processing apparatus 100 does not perform any corresponding process.

[Specific Examples of the Process Corresponding to the Discriminated Object]

Explained below are some processes corresponding to the discriminated object and carried out by the information processing apparatus 100 embodying the present disclosure.

(A) Image Processing

As the process corresponding to the discriminated object, the information processing apparatus 100 may perform image processing on the image area that corresponds to the object discriminated typically by the process (2) above (object discrimination process). For example, the image processing carried out by the information processing apparatus 100 may include an expansion process for expanding the image area corresponding to the discriminated object, an extended definition process for enhancing the image quality of the image area in question typically through smoothing and super-resolving, or a combination of such processes. The image processing for the embodiments of this disclosure is not limited to the expansion process and/or the extended definition process. For example, the information processing apparatus 100 may preferably perform a 2D-to-3D conversion process on the image of the image area corresponding to the discriminated object. Also, the information processing apparatus 100 may adjust the image signal using, for example, the technique disclosed in Japanese Patent Laid-Open No. 2007-256961 filed by this applicant in such a manner that the image areas other than the image area corresponding to the discriminated object in the image are made less conspicuous than the latter image area.

Figure 5:
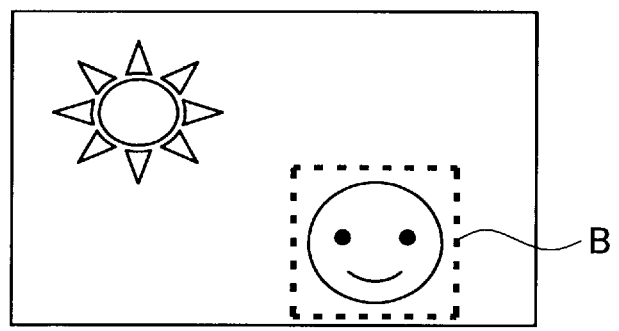
FIG. 5 is an explanatory view explaining a typical process performed corresponding to the discriminated object by the information processing apparatus embodying the present disclosure.

FIG. 5 is an explanatory view explaining a typical process performed corresponding to the discriminated object by the information processing apparatus 100 embodying the present disclosure. FIG. 5 shows an example in which the image area B in FIG. 2 is discriminated by the process (2) above (object identification process) as the image area including the object drawing the user's line of sight.

The information processing apparatus 100 performs the above-mentioned image processing on the image area B shown in FIG. 5 and does nothing with regard to the other image areas. By carrying out the image processing solely on the image area B, the information processing apparatus 100 can shoulder less load than when processing the entire image. And as explained above, if the image area drawing the user's line of sight includes an object, it is highly likely that the user's attention is drawn to that object. In such a case, the information processing apparatus 100 can offer the user sufficient benefits of the image processing by performing it on the image area B.

Thus by carrying out the above-described image processing on the image area corresponding to the discriminated object, the information processing apparatus 100 can emphasize the object drawing the user's attention and enhance the image quality of the object in question while shouldering less load than when processing the entire image.

(B) Display Process

As the process corresponding to the discriminated object, the information processing apparatus 100 may perform a display process in reference to the image area corresponding to the object discriminated by the process (2) above (object identification process), for example.

Figure 6:
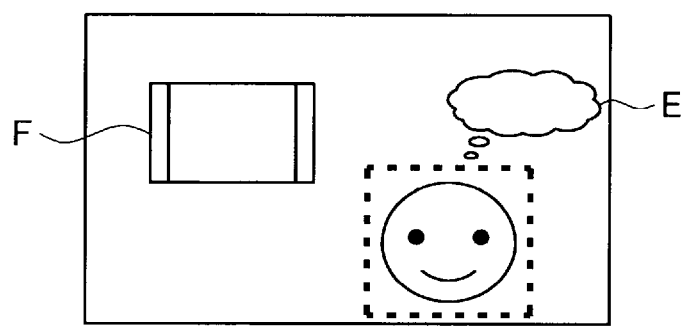
FIG. 6 is an explanatory view explaining another typical process performed corresponding to the discriminated object by the information processing apparatus embodying the present disclosure.

FIG. 6 is an explanatory view explaining another typical process performed corresponding to the discriminated object by the information processing apparatus 100 embodying the present disclosure. As in FIG. 5, FIG. 6 shows an example in which the image area B in FIG. 2 is discriminated as the image area including the object drawing the user's line of sight by the process (2) above (object identification process). The example in FIG. 6 also shows that two display processes (to be discussed later) are carried out. Obviously, the information processing apparatus 100 can perform one or a plurality of display processes.

For example, the information processing apparatus 100 may cause what is indicated by the auxiliary information corresponding to the object discriminated by the process (2) above (object identification process) to be displayed near the image area (E in FIG. 6) corresponding to the discriminated object. What is indicated by the auxiliary information and displayed by the information processing apparatus 100 may include the content of the auxiliary information as part of the object information or the content of the auxiliary information stored beforehand in a storage portion (to be discussed later). The above wording regarding the information processing apparatus 100 embodying the present disclosure in a manner "displaying what is indicated by the auxiliary information near the image area corresponding to the discriminated object" may typically include displaying the content of the auxiliary information adjacent to the image area corresponding to the discriminated object, and displaying the content of the auxiliary information in proximity to the image area in question. Although FIG. 6 shows an example in which the information processing apparatus 100 displays what is indicated by the auxiliary information in pop-up form, this is obviously not limitative of the method for displaying the content of auxiliary information as part of the embodiments of the present disclosure.

As explained above, if the image area drawing the user's line of sight includes an object, it is highly likely that the user's attention is drawn to the object in question. Thus if the content of the auxiliary information related to the discriminated object is displayed near the image area corresponding to the discriminated object, the user can visually obtain information related to the object of interest without moving his or her line of sight extensively.

The display process performed by the information processing apparatus 100 embodying this disclosure is not limited to what was described above. For example, the information processing apparatus 100 need not display in superposed fashion the image area corresponding to the discriminated object and any image different from the images displayed on the display screen (e.g., F in FIG. 6) and/or the content of information not related to the image in question. The above-mentioned different image may be one that is displayed in PIP (picture in picture) or POP (picture on picture) form, for example. The information not related to the image in question may include news flashes and advertisements, for example.

As explained above, where an object is included in the image area drawing the user's line of sight, it is highly likely that the user's attention is drawn to that object and that the other image areas are not drawing the user's attention. Thus when the other images and/or the information not related to the image in question are not displayed in superposed fashion on the image area corresponding to the discriminated object, it is possible to display such images and information on the display screen without encroaching on the object (or image area) drawing the user's attention.

(C) Process of Recording Attention-Drawing Object Information

As the process corresponding to the discriminated object, the information processing apparatus 100 may record to a storage portion or the like (to be discussed later) attention-drawing object information indicative of the object discriminated by the process (2) above (object identification process). In this case, the information processing apparatus 100 may record, as the attention-drawing object information, the object information corresponding to the object discriminated by the process (2) above (object identification process) from among the object information generated by the process (1) above (object information generation process). For example, the information processing apparatus 100 may record the attention-drawing object information to an object database capable of accommodating a plurality of items of attention-drawing object information. As another example, the information processing apparatus 100 may record each of the items of attention-drawing object information as an attention-drawing object file. The attention-drawing object information relevant to the embodiments of the present disclosure is not limited to what was described above. For example, the information processing apparatus 100 may record, as the attention-drawing object information, the above-described object information supplemented with some other information such as a recording time (e.g., the time period in which the user's attention has been drawn) or information identifying the image (e.g., a file name, or information indicative of the position of the image in the sequence of all frames).

As explained above, if an object is included in the image area drawing the user's line of sight, it is highly likely that the user's attention is drawn to that object. Thus, the user's preferences can be grasped by analyzing the attention-drawing object information thus stored. Also, if the image reproduced by an external apparatus or by this information processing apparatus 100 contains an image area including an object identical or similar to (i.e., corresponding to) the object designated by the stored attention-drawing object information, then the information processing apparatus 100 can perform its image processing such as the extended definition process on the image area in question. Furthermore, if the image contains an image area including the above-mentioned corresponding object, the information processing apparatus 100 may, as in the process (B) above (display process), display what is indicated by the auxiliary information corresponding to the object designated by the stored attention-drawing object information near the image area in question.

(D) Interlocking Process with the Server 200 (a Typical External Device)

The processes (A) through (C) discussed above are typical processes corresponding to the discriminated object and carried out basically on a stand-alone basis. However, these processes are not limitative of the processing performed corresponding to the discriminated object by the information processing apparatus 100 embodying the present disclosure. For example, it is also possible to carry out an interlocking process with an external device such as the server 200.

(D-1) First Example

As the process corresponding to the discriminated object, the information processing apparatus 100 may generate attention-drawing object information in the same manner as the process (C) above (process of recording attention-drawing object information) and transmit the generated attention-drawing object information to an external device such as the server 200.

When the information processing apparatus 100 transmits the attention-drawing object information to the sever 200 (a typical external device; ditto hereunder), the server 200 can analyze each image to see which object is drawing the user's attention through the use of the received attention-drawing object information. When acquiring attention-drawing object information from each of a plurality of information processing apparatuses 100 connected directly or via a network, the server 200 can analyze not only the object drawing the attention of a single user but also the objects drawing the attention of a plurality of users. In this manner, when the information processing apparatus 100 transmits attention-drawing object information to the server 200, the server 200 can implement any one of three processes (a) through (c) to be discussed below, for example. Obviously, the processes implemented by the server 200 when the information processing apparatus 100 transmits attention-drawing object information thereto are not limited to the three processes (a) through (b) below.

(a) Analysis of the Preferences of the User Using the Information Processing Apparatus 100

Carrying out this process (a) allows the server 200 to grasp the user's preferences through the analysis of which object is drawing the user's attention. For example, the analysis may enable the server 200 to provide the user with information conforming to his or her preferences (as a sort of recommendation).

(b) Calculation of the Attention-Drawing Rate (Viewing Rate) Regarding Each Object Using Information Indicative of Viewing Points as Part of Attention-Drawing Object Information The attention-drawing rate calculated by this process (b) provides an indicator indicative of which object in which image was drawing the user's attention. This allows the server 200 to offer an indicator appreciably more precise than the ordinary indicator solely indicating which content was drawing the user's attention. Since the above-described attention-drawing object information corresponds to the object information based on the metadata generated through operations of the content provider, for example, it is possible for the content provider to assign weights to each of the objects involved.

(c) Offering of the Calculated Attention-Drawing Rate to an External System Such as a Content-Providing System (e.g., TV Broadcasting System)

Given the attention-drawing rate calculated by this process (c), the external system can provide content (images, or images and sounds (including music; ditto hereunder)) that may include more objects having high attention-drawing rates than before. Thus, carrying out this process (c) makes it possible to implement a more interactive video delivery service than before by automatically (or manually) pointing cameras at objects having high attention-drawing rates of users during a live telecast, for example. Obviously, the server 200 may also possess the functionality of the external system such as the above-mentioned content-providing system.

(D-2) Second Example

The information processing apparatus 100 acquires auxiliary information from the external apparatus such as the server 200 and displays the content of the acquired auxiliary information. More specifically, as with the process (C) above (process of recording attention-drawing object information), the information processing apparatus 100 stores attention-drawing object information. If there is any image area that includes an object identical or similar to the object designated by the stored attention-drawing object information (i.e., corresponding object), then the information processing apparatus 100 acquires from the server 200 or the like the auxiliary information corresponding to the attention-drawing object information in question. And as with the process (B) above (display process), the information processing apparatus 100 causes the content of the acquired auxiliary information to be displayed near the above-mentioned image area in the reproduced image.

In this case, it is more likely that the auxiliary information stored in the external apparatus such as the server 200 is larger in quantity and more up to date than the auxiliary information stored in the information processing apparatus 100. Thus, by causing the content of the auxiliary information acquired from the external apparatus such as the server 200 to be displayed, the information processing apparatus 100 can provide the user with more significant information about the object drawing the user's attention.

For example, by performing the processes (1) (object information generation process) through (3) (execution process) above, the information processing apparatus 100 can discriminate the object drawing the user's line of sight and perform the process corresponding to the object drawing the user's attention in the image. Thus, the processing approach to the embodiments of the present disclosure may be implemented by carrying out the processes (1) (object information generation process) through (3) (execution process) above, for example.

(Server, and Information Processing Apparatus Embodying the Present Disclosure)

Explained below is a typical structure of the information processing apparatus 100 embodying the present disclosure as well as a typical structure of the server 200 capable of performing processes in interlocked relation to the information processing apparatus 100, both the apparatus 100 and the server 200 being capable of carrying out processes relevant to the above-described processing approach to the embodiments of this disclosure.

What follows is an explanation of a typical information processing system made up of the information processing apparatus 100 and server 200 interconnected by a network (called the information processing system 1000 hereunder), the explanation entailing descriptions of typical structures of the information processing apparatus 100 and server 200. The information processing apparatus 100 is not limited to being a component of the information processing system 1000. For example, as discussed above in connection with the processes (A) through (C) in the process (3) above (execution process), the information processing apparatus 100 embodying the present disclosure is capable of performing the process corresponding to the discriminated object basically on a stand-alone basis.

(I) Structure of the Information Processing Apparatus 100

[First Embodiment]

Figure 7:
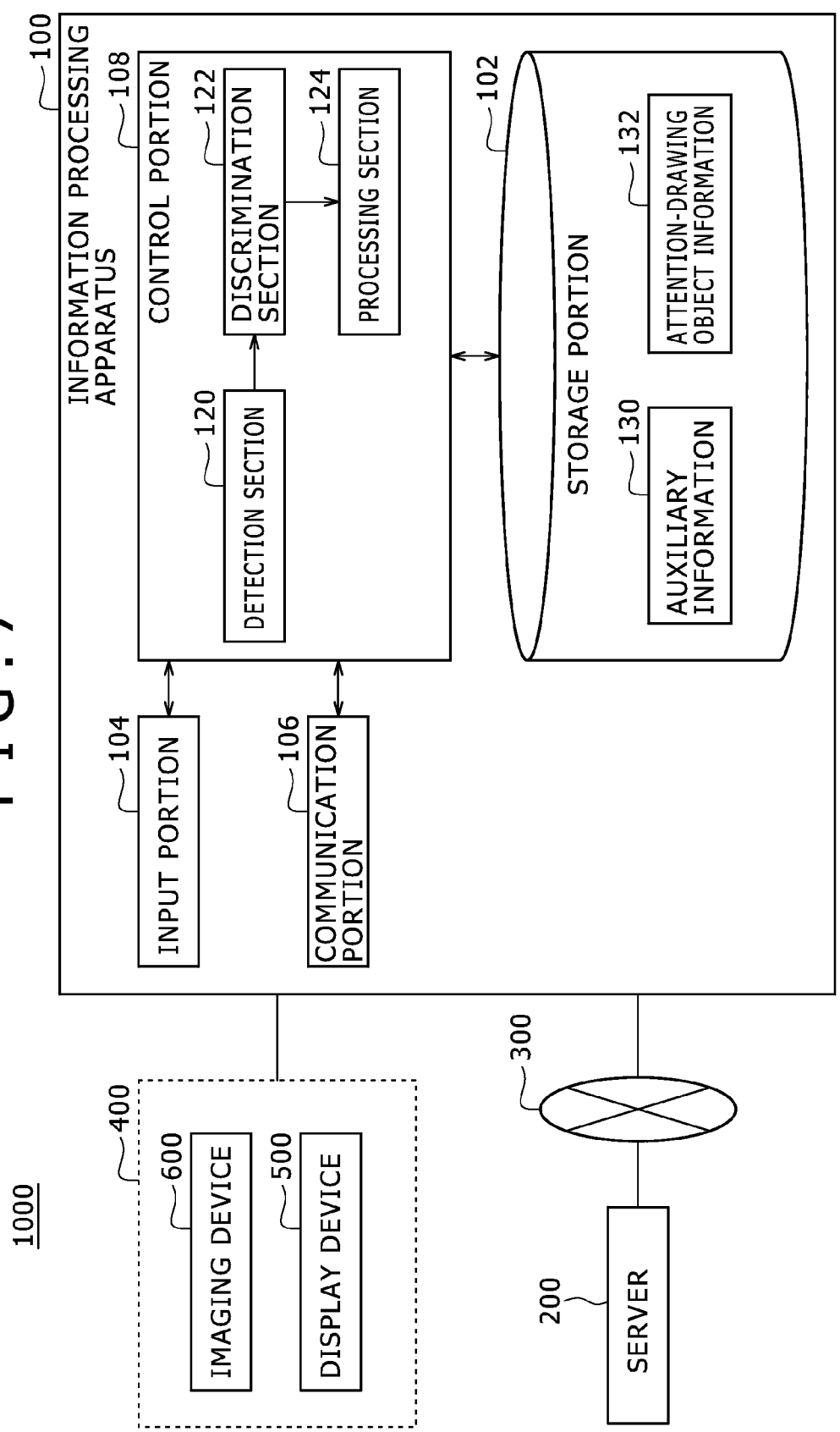
FIG. 7 is a block diagram showing a typical structure of an information processing apparatus as a first embodiment of the present disclosure.

FIG. 7 is a block diagram showing a typical structure of the information processing apparatus 100 as a first embodiment of the present disclosure. FIG. 7 also indicates the server 200 connected to the information processing apparatus 100 via a network 300. That is, the configuration shown in FIG. 7 may be considered the information processing system 1000 including the information processing apparatus 100 and server 200. The network 300 may be any one of, say, wired networks including a LAN (local area network) and a WAN (wide area network); wireless networks including a wireless WAN (WWAN; wireless wide area network) involving base stations, and a wireless MAN (WMAN; wireless metropolitan area network); and the Internet using communication protocols such as TCP/IP (Transmission Control Protocol/Internet Protocol).

Furthermore, FIG. 7 shows a display system 400 that displays images (still or moving images) on a display screen and generates coordinate information by imaging the display direction on the display screen. In FIG. 7, the display system 400 is shown made up of a display device 500 for performing display and an imaging device 600 for carrying out imaging. However, this example is not limitative of the configuration of the display system 400 as part of the embodiments of this disclosure. For example, the display system 400 may be an entity that integrates the display device 500 with the imaging device 600 (such as a display device having the imaging capability).

Referring to FIG. 7, the information processing apparatus 100 may include a storage portion 102, an input portion 104, a communication portion 106, and a control portion 108, for example.

The information processing apparatus 100 may also include a ROM (read only memory; not shown) and a RAM (random access memory; not shown). The information processing apparatus 100 may typically have its components interconnected by a bus serving as data transmission channels. For example, the ROM (not shown) may store the programs to be used by the control portion 108 as well as processing data such as operation parameters. The RAM (not shown) may temporarily store the program and data for use by the control portion 108 and other components.

[Typical Hardware Structure of the Information Processing Apparatus 100]

Figure 8:
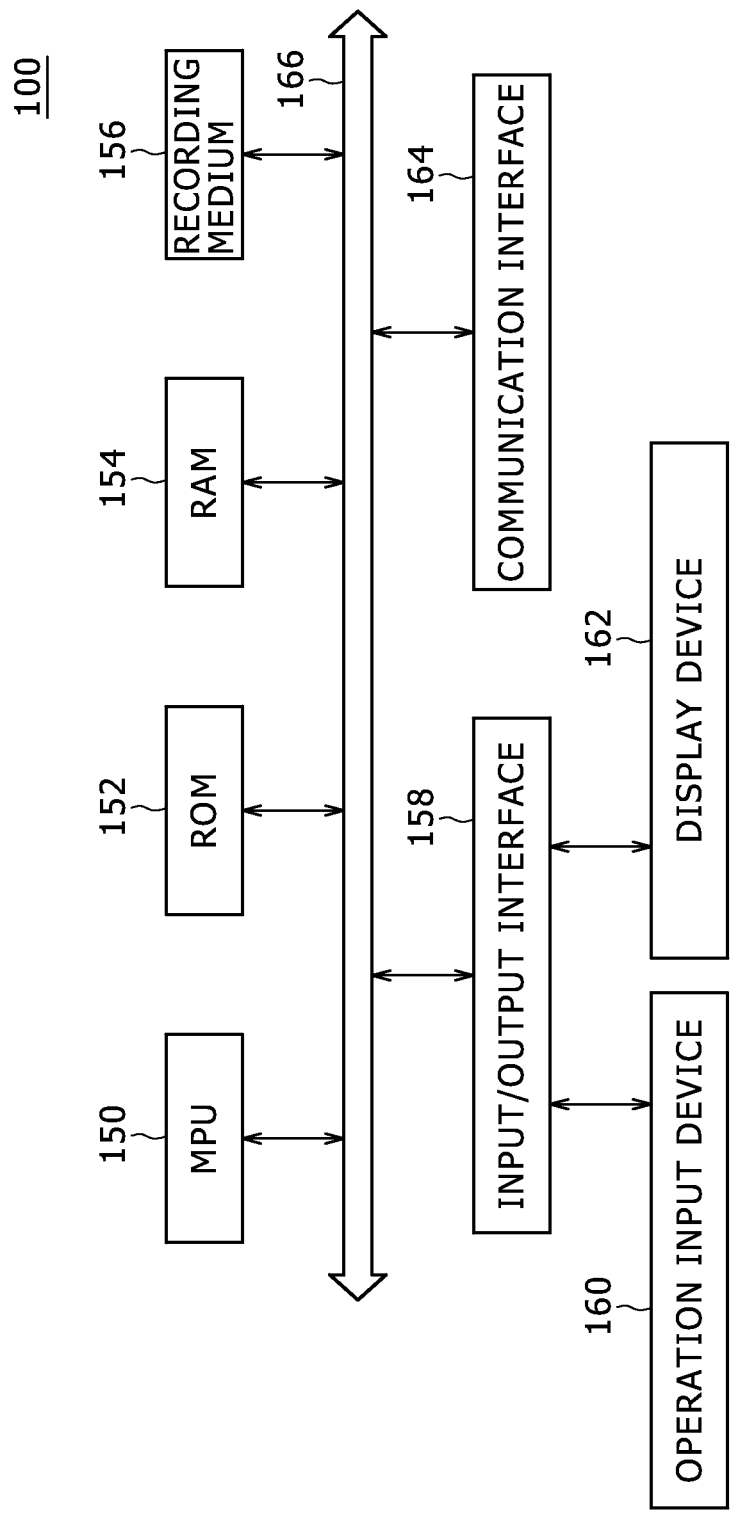
FIG. 8 is an explanatory view showing a typical hardware structure of the information processing apparatus embodying the present disclosure.

FIG. 8 is an explanatory view showing a typical hardware structure of the information processing apparatus 100 embodying the present disclosure. Referring to FIG. 8, the information processing apparatus 100 may include an MPU 150, a ROM 152, a RAM 154, a recording medium 156, an input/output interface 158, an operation input device 160, a display device 162, and a communication interface 164. For example, the information processing apparatus 100 may have its components interconnected by a bus 166 serving as data transmission channels.

The MPU 150 may be typically composed of an integrated circuit that includes an MPU (micro processing unit), a plurality of circuits for implementing the control function, and a plurality of circuits for implementing diverse functions such as image processing. As such, the MPU 150 functions as the control portion 108 for controlling the information processing apparatus 100 as a whole. Within the information processing apparatus 100, the MPU 150 plays the roles of a detection section 120, a discrimination section 122, and a processing section 124. Also, the MPU 150 may play the role of a reproduction processing section, to be discussed later.

The ROM 152 stores the programs to be used by the MPU 150 as well as control data such as operation parameters. The RAM 154 may temporarily store the programs to be executed by the MPU 150 and other resources.

The recording medium 156 functions as the storage portion 102, storing various data such as auxiliary information, attention-drawing object information and content data, as well as applications for example. The recording medium 156 may be any one of magnetic recording media such as hard disks, or nonvolatile memories including EEPROM (electrically erasable and Programmable Read Only Memory), flash memories, MRAM (magneto-resistive random access memory), FeRAM (ferroelectric random access memory), and PRAM (phase change random access memory). The recording medium 156 may be removably attached to the information processing apparatus 100.

The input/output interface 158 may be connected with the operation input device 160 and display device 162, for example. The input/output interface 158 can also play the role of the input portion 104. The operation input device 160 functions as an operation portion (not shown), and the display device 162 functions as a display portion (to be discussed later). The input/output interface 158 may include a USB (Universal Serial Bus) terminal, a DVI (Digital Visual Interface) terminal, an HDMI (High-Definition Multimedia Interface) terminal, and various processing circuits for example. The operation input device 160 may be typically mounted on the information processing apparatus 100 and connected to the input/output interface 158 therein. The operation input device 160 may be any one or a combination of buttons, arrow keys, and a rotary selector such as a jog dial for example. The display device 162 may be typically mounted on the information processing apparatus 100 and connected to the input/output interface 158 therein. The display device 162 may be any one of a liquid crystal display (LCD), an organic electroluminescence display, and an organic light emitting diode display (OLED) for example. Obviously, the input/output interface 158 may also be connected with an operation input device (e.g., keyboard and mouse) as an external apparatus to the information processing apparatus 100, with a display device (e.g., display device 300), and with an external device such as the imaging device (e.g., imaging device 600). Also, the display device 162 may be arranged to be capable of displaying and user operations, such as a touch screen.

The communication interface 164 is communication means as part of the information processing apparatus 100. As such, the communication interface 164 functions as the communication portion 106 for communicating, in wired or wireless fashion, with the external apparatus such as the server 200 directly or via the network 300. For example, the communication interface 164 may be composed of a communication antenna with an RF circuit (for wireless communication), an IEEE802.15.1 port with a transceiver circuit (for wireless communication), an IEEE802.11b port with a transceiver circuit (for wireless communication), or a LAN terminal with a transceiver circuit (for wired communication).

The information processing apparatus 100 may perform processes relevant to the processing approach to the embodiments of the present disclosure when structured as illustrated in FIG. 8, for example. The hardware structure of the information processing apparatus 100 embodying this disclosure is not limited to the structure shown in FIG. 8.

For example, the information processing apparatus 100 may be furnished with an imaging device which serves as an imaging portion (to be discussed later) and which is made up of a lens/imaging element arrangement and a signal processing circuit. In the case above, the information processing apparatus 100 can perform processes using the coordinate information generated by the apparatus 100 itself. The lens/imaging element arrangement may be constituted by optical lenses, a CCD (charge coupled device), and an image sensor employing a plurality of imaging elements such as CMOS (complementary metal oxide semiconductors) for example. The signal processing circuit may typically include an AGC (automatic gain control) circuit and an ADC (analog-to-digital converter), thereby converting an analog signal generated by the imaging elements into a digital signal (image data). The signal processing circuit may also include an MPU or the like that generates coordinate information by carrying out the above-described coordinate information generation process using the image data.

The information processing apparatus 100 may also be furnished with a DSP (digital signal processor) and a sound output device composed of amplifiers, speakers, etc. The information processing apparatus 100 may further be provided with a slot that accommodates an external memory and allows data to be written and read thereto and therefrom, and an optical disk drive for reading data from optical disks. Furthermore, the information processing apparatus 100 may be structured to exclude the operation device 160 and display device 162 shown in FIG. 8 as well as the communication interface, for example.

Referring again to FIG. 7, the structure of the information processing apparatus 100 as the first embodiment of the present disclosure will be explained below. The storage portion 102 is storage means as part of the information processing apparatus 100. For example, the storage portion 102 may be a magnetic recording medium such as a hard disk or a nonvolatile memory such as a flash memory.

The storage device 102 may store diverse data such as auxiliary information, attention-drawing object information and content data, as well as applications. FIG. 7 shows an example in which auxiliary information 130 and attention-drawing object information 132 are stored in the storage portion 102.

The input portion 104 may typically receive the image data corresponding to the image displayed on the display screen (when the display device 500 performs a reproduction process), the metadata corresponding to the image in question, and the coordinate data generated by the imaging device 600. The input portion 104 forwards the various received (i.e., input) data to the control portion 108. The input device 104 may include a USB terminal, a DVI terminal, an HDMI terminal, and various processing circuits, but is not limited to these components. For example, the input portion 104 may be structured otherwise in a manner capable of receiving the diverse data from the external apparatus in wired or wireless fashion.

Also, when the information processing apparatus 100 displays the image represented by the image data reproduced by the apparatus 100 on the display screen of the display device 500, the information processing apparatus 100 may transmit the image data to the display device 500 via the input portion 104. That is, the input portion 104 may play the role of a connection portion for permitting data exchanges between the information processing apparatus 100 and the external apparatus such as the display device 500 (or external system). Although FIG. 7 shows a structure that includes the input portion 104 and communication portion 106, this is not limitative of the structure of the information processing apparatus 100. For example, the information processing apparatus 100 embodying the present disclosure may have the input portion 104 and communication portion 106 (to be discussed later) integrated into a single portion.

The communication portion 106 is communication means as part of the information processing apparatus 100. As such, the communication portion 106 communicates with the external apparatus such as the server 200 directly or via the network 300 in wired or wireless fashion. Also, the communication portion 106 may be controlled in operation typically by the control portion 108. The communication portion 106 may include a communication antenna with an RF circuit and a LAN terminal with a transceiver circuit, but is not limited thereto. For example, the communication portion 106 may be structured as desired in a manner capable of communicating with the external apparatus via the network 300.

When equipped with the communication portion 106, the information processing apparatus 100 can perform the process (3) above (execution process) in interlocked relation with the server 200.

The control portion 108 may be typically composed of an integrated circuit that includes an MPU, a plurality of circuits for implementing the control function, and a plurality of circuits for implementing diverse functions including image processing. As such, the control portion 108 plays the role of controlling the entire information processing apparatus 100. Also, the control portion 108 includes the detection section 120, discrimination section 122 and processing section 124, and plays the leading role of performing processes relevant to the processing approach to the embodiments of the present disclosure. The control portion 108 may include a communication control section (not shown) for controlling communications with the external apparatus such as the server 200.

The detection section 120 plays the leading role of performing the process (1) above (object information generation process). More specifically, the detection section 120 may typically detect an object in an image by utilizing the metadata related to the image and/or by processing the image displayed on the display screen. For every object thus detected, the information processing apparatus 100 generates object information.

The discrimination section 122 plays the leading role of performing the process (2) above (object identification process). More specifically, the discrimination section 122 may typically discriminate the object (or image area) drawing the user's line of sight based on the coordinate information generated by the display device 500 (external imaging device) and sent from the input portion 104 and on the object information generated by the detection section 120.

The processing section 124 plays the leading role of performing the process (3) above (execution process). More specifically, based on the results of the discrimination by the discrimination section 122 for example, the processing section 124 may selectively carry out the process relevant to the object discriminated object such as any one of the processes (A) through (D) above. In this case, the processing section 124 may either perform a predetermined process corresponding to the discriminated object or carry out the process selected by the user's operations regarding the discriminated object.

When made up of the detection section 120, discrimination section 122 and processing section 124 for example, the control portion 108 cay play the leading role of performing the processes (1) (object information generation process) through (3) (execution process) above relevant to the processing approach.

The structure of the control portion 108 is not limited to the structure shown in FIG. 7. For example, the control portion 108 may further include a reproduction processing section (corresponding to a reproduction processing section 126, to be discussed later) that reproduces content data representing images or both images and sounds. In this case, the information processing apparatus 100 may typically cause the display screen of the display device 500 to display the image represented by the content data reproduced by the reproduction processing section so that the image can be processed by the detection section 120 and discrimination section 122.

When structured as shown in FIG. 7, the information processing apparatus 100 can implement the processes (1) (object information generation process) through (3) (execution process) above relevant to the processing approach. Thus with the structure of FIG. 7 for example, the information processing apparatus 100 can discriminate the object drawing the user's attention in the image displayed on the display screen and viewed by the user, before performing the process corresponding to the discriminated object.

[Second Embodiment]

Figure 9:
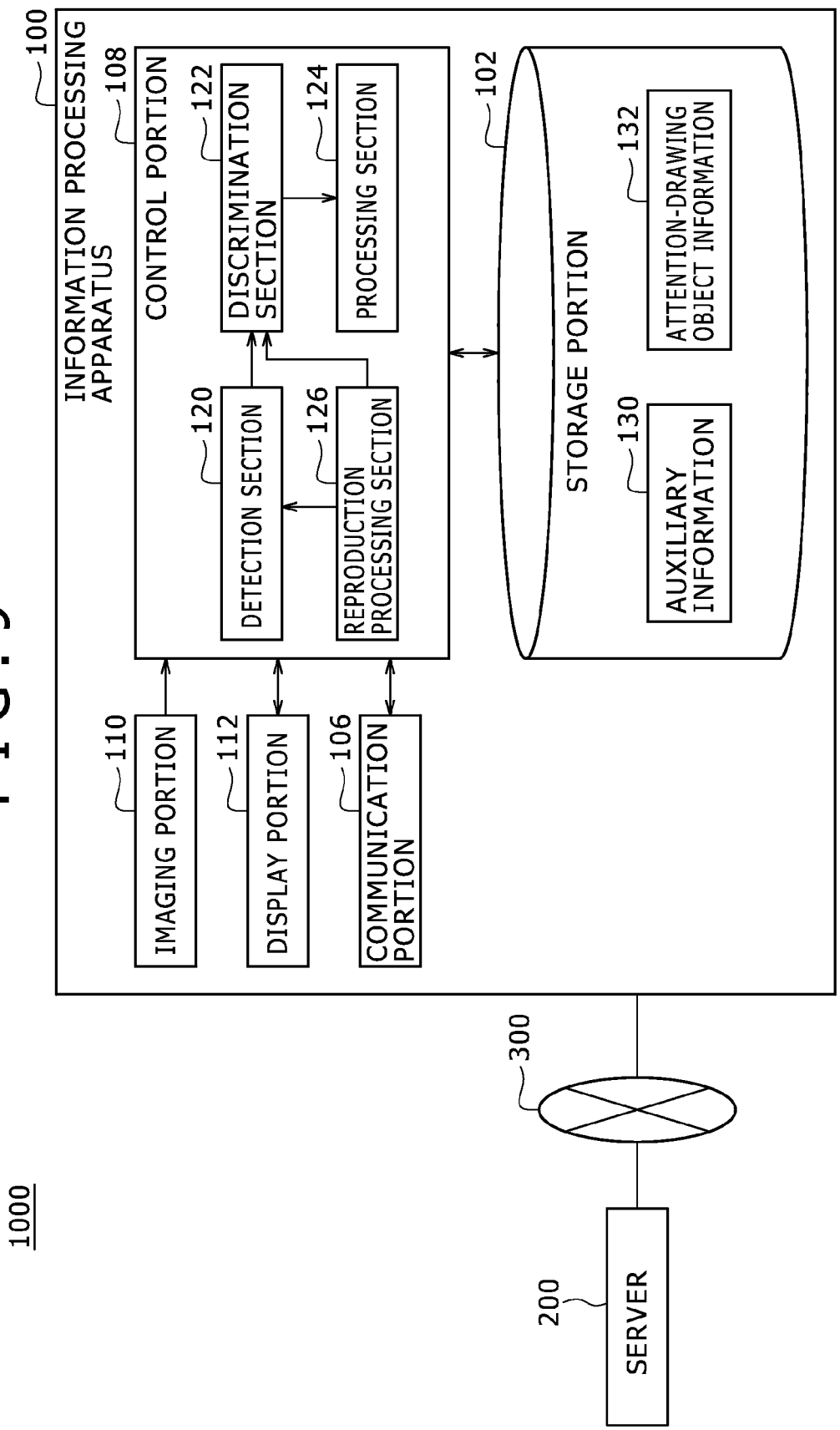
FIG. 9 is a block diagram showing a typical structure of an information processing apparatus as a second embodiment of the present disclosure.

In the foregoing description, the information processing apparatus 100 as the first embodiment of this disclosure was shown structured to discriminate the object drawing the user's attention in the image viewed by the user and displayed on the display screen of the display device 500 (external display device) as part of the display system 400, before carrying out the process corresponding to the discriminated object. However, the above-described structure of the first embodiment is not limitative of the structure of the information processing apparatus 100 embodying the present disclosure. FIG. 9 is a block diagram showing another typical structure of the information processing apparatus 100 as a second embodiment of the present disclosure.

The information processing apparatus 100 shown in FIG. 9 as the second embodiment is structured basically the same as the information processing apparatus 100 indicated in FIG. 7 as the first embodiment. The major difference between the structure of the information processing apparatus 100 in FIG. 9 as the second embodiment and the structure of its counterpart in FIG. 7 as the first embodiment is that the information processing apparatus 100 as the second embodiment does not have the input portion 104 but possesses an imaging portion 110 and a display portion 112. When compared with the information processing apparatus 100 in FIG. 7 as the first embodiment, the information processing apparatus 100 in FIG. 9 as the second embodiment is furnished with a control portion 108 including a reproduction processing section 126 having the functionality similar to that of the reproduction processing section in the first embodiment.

The imaging portion 110 is imaging means as part of the information processing apparatus 100. As such, the imaging portion 110 detects the user's line of sight on the image displayed on the display screen of the display portion 112 so as to generate coordinate information. More specifically, the imaging portion 110 may be typically composed of a lens/imaging element arrangement and a signal processing circuit. An analog signal generated by the imaging elements is converted to a digital signal (image data) by the signal processing circuit. The imaging portion 110 then proceeds with coordinate information generation by getting the signal processing circuit to perform processes for generating the above-mentioned coordinate information using the above-described image data. The imaging portion 110 sends the generated coordinate information to the control portion 108.

The display portion 112 is display means as part of the information processing apparatus 100. As such, the display portion 112 displays diverse information and images on its display screen. The pictures displayed on the display screen of the display portion 112 may typically include a content display screen for displaying the image (content) reproduced by the reproduction processing section 126, and an operation screen through which the user may instruct the information processing apparatus 100 to perform desired operations. The display portion 112 may be composed of any one of such display devices as a liquid crystal display and an organic electroluminescence display, for example.

The information processing apparatus 100 in FIG. 9 as the second embodiment is basically structured the same as the information processing apparatus 100 in FIG. 7 as the first embodiment. When structured as shown in FIG. 9, the information processing apparatus 100 as the second embodiment can thus implement the processes (1) (object information generation process) through (3) (execution process) above relevant to the processing approach, like the information processing apparatus 100 as the first embodiment. Therefore, the information processing apparatus 100, with its structure shown in FIG. 9 as the second embodiment, can discriminate the object drawing the user's attention in the image displayed on the display screen and viewed by the user and carry out the process corresponding to the discriminated object.

(II) Structure of the Server 200

FIG. 10 is a block diagram showing a typical structure of the server 200 embodying the present disclosure. Referring to FIG. 10, the server 200 may include a storage portion 202, a communication portion 204, and a control portion 206 for example.

The server 200 may also include a ROM (not shown) and a RAM (not shown). The server 200 has its components interconnected by a bus that serves as data transmission channels. In this setup, the ROM (not shown) may typically store programs and processing data such as operation parameters for use by the control portion 206. The RAM (not shown) may temporarily store the programs and data currently operated on by the control portion 206.

[Typical Hardware Structure of the Server 200]

The server 200 may have the same hardware structure as that of the information processing apparatus 100 embodying the present disclosure, as shown in FIG. 8 for example. Obviously, the hardware structure of the server 200 embodying this disclosure is not limited to the structure shown in FIG. 8.

The storage portion 200 is storage means as part of the server 200. For example, the storage portion 202 may be a magnetic recording medium such as a hard disk or a nonvolatile memory such as a flash memory. The storage portion 202 may typically store diverse data such as auxiliary information, user information including information about the user's preferences based on the result of the analysis of attention-drawing object information (a collection of information may be called a database hereunder where appropriate), content data, and applications. FIG. 10 shows an example in which the storage portion 202 stores an auxiliary information database 220 capable of accommodating a plurality of items of auxiliary information, and a user information database 222 capable of storing a plurality of items of user information regarding each of the users involved.

The communication portion 204 is communication means as part of the server 200. As such, the communication portion 204 communicates with each of a plurality of information processing apparatuses 100 and an external apparatus such as a content offering system 700 (a typical external system) directly or via the network 300 in wired or wireless fashion. Also, the communication portion 204 may be controlled in operation typically by the control portion 206. When furnished with the communication portion 204, the server 200 can obtain attention-drawing object information from each of a plurality of information processing apparatuses 100 and, in response to an auxiliary information transmission request sent therefrom, can transmit auxiliary information to the requesting information processing apparatus 100. That is, possessing the communication portion 204 allows the server 200 to implement processes such as the process (D) above in interlocked relation with the information processing apparatus 100.

The communication portion 204 may include a communication antenna with an RF circuit and a LAN terminal with a transceiver circuit, but is not limited thereto. For example, the communication portion 204 may be structured as desired in a manner capable of communicating with the external apparatus (or external system) via the network 300.

The control portion 206 may be typically composed of an integrated circuit that includes an MPU and a plurality of circuits for implementing the control function. As such, the control portion 206 plays the role of controlling the entire server 200. The control portion 206 also plays the role of carrying out processes such as the process (D) above in interlocked relation with the information processing apparatus 100.

More specifically, the control portion 206 may analyze what kind of object is drawing the user's attention based on the attention-drawing object information received by the communication portion 204 (in the process (a) above), for example. The control portion 206 may then record the result of the analysis to the user information database in the storage portion 202.

Also, the control portion 206 may calculate the attention-drawing rate of each object based on the attention-drawing object information transmitted from a plurality of information processing apparatuses 100 and received by the communication portion 204 (in the process (b) above) for example. In this case, the control portion 206 may calculate the attention-drawing rate of each object by dividing, for each object, the number of objects designated by the received attention-drawing object information multiplied by the viewing points corresponding to the object in question, by the number of the received items of attention-drawing object information. Obviously, the method for calculating the attention-drawing rates for objects as part of the embodiments of this disclosure is not limited to the above-described method.

The control portion 206 may record the information composed of the attention-drawing rates thus calculated to the storage portion 202 for example. Alternatively, the control portion 206 may control the communication portion 204 to transmit the information of the calculated attention-drawing rates to the content offering system 700 (in the process (c) above).

If the communication portion 204 receives an auxiliary information transmission request sent from an information processing apparatus 100, the control portion 206 reads the auxiliary information corresponding to the object designated by the auxiliary information transmission request in question from the auxiliary information database 220 held in the storage portion 202. The control portion 206 then controls the communication portion 204 to transmit the auxiliary information retrieved from the auxiliary information database 220 to the information processing apparatus 100 that has sent the auxiliary information transmission request. If the auxiliary information corresponding to the object designated by the auxiliary information transmission request is not found in the auxiliary information database 220 held in the storage portion 202, the control portion 206 may communicate with an external apparatus (e.g., another server) via the network 300 and acquire the corresponding auxiliary information from the external apparatus in question. If the control portion 206 cannot transmit the auxiliary information corresponding to the object designated by the auxiliary information transmission request, then the control portion 206 controls the communication portion 204 to transmit a response indicative of an error to the information processing apparatus 100 that has transmitted the auxiliary information transmission request.

By carrying out the above-described steps for example, the control portion 206 may perform processes such as the process (D) above in interlocked relation with the information processing apparatus 100.

By executing the processing shown in FIG. 10, the server 200 can implement processes such as the process (D) above in interlocked relation with the information processing apparatus 100. Obviously, the structure of the server 200 embodying the present disclosure is not limited to the structure discussed above.

As explained above, the information processing apparatus 100 embodying the present disclosure may typically perform the processes (1) (object information generation process) through (3) (execution process) above as the processes relevant to the processing approach. Through the process (2) above (object identification process), the information processing apparatus 100 discriminates the object drawing the user's line of sight based on coordinate information and object information. If an object is included in the image area drawing the user's line of sight within the image displayed on the display screen and viewed by the user, it is highly likely that the user's attention is drawn to that object. If no object is included in the image area drawing the user's line of sight within the image displayed on the display screen and viewed by the user, then it is highly likely that no object drawing the user's attention exists within the image. Thus by discriminating the object drawing the user's line of sight, the information processing apparatus 100 provides an appreciably higher level of accuracy than before in discriminating the object drawing the user's attention within the image.

As a result, the information processing apparatus 100 can discriminate the object drawing the user's attention in the image displayed on the display screen and viewed by the user, and perform the process corresponding to the discriminated object.

Also, as the process corresponding to the discriminated object, the information processing apparatus 100 may perform any of the processes (A) through (C) above (basically stand-alone processes) or the process (D) above (process performed in interlocked relation with the external apparatus such as the server 200). Thus, the information processing apparatus 100 offers the benefits of the processes performed corresponding to the discriminated object as discussed above.

Although the present disclosure has been described above using the information processing apparatus 100 as one preferred embodiment, this is not limitative of how this disclosure can be implemented. Possible embodiments of the present disclosure may include computers such as the PC (personal computer) and server, display devices such as TV sets and signage devices, portable communication devices such as mobile phones, video/audio players (or video/audio recording and reproducing devices), and game consoles.

Whereas the present disclosure has also been described above using the server 200 as another preferred embodiment, this is not limitative of how this disclosure can be implemented. Other possible embodiments of the present disclosure may include computers such as the PC (personal computers) and server, as well as a group of a plurality of servers (a group of computers).

While the present disclosure has also been described above using the display system 400 as a further preferred embodiment, this is not limitative of how this disclosure can be implemented in many other ways. Other possible embodiments of the present disclosure may include various devices capable of displaying and/or taking images, including computers such as the PC (personal computers), display devices such as TV sets and signage devices, and portable communication devices such as mobile phones. The display system 400 embodying this disclosure may also be a combination of a display device with an imaging device.

(Programs Embodying the Present Disclosure)

[Program Relevant to the Information Processing Apparatus]

A program for causing a computer to function as an information processing apparatus embodying the present disclosure (e.g., a program for carrying out the processes (1) (object information generation process) through (3) above (execution process)) may be devised so as to discriminate the object drawing the user's attention in the image displayed on the display screen and viewed by the user and to perform the process corresponding to the discriminated object.

[Program Relevant to the Server]

A program for causing a computer to function as a server embodying the present disclosure (e.g., a program for carrying out processes in interlocked relation with the information processing apparatus also embodying this disclosure) may be devised to implement an information processing system that can perform the process corresponding to the object which is discriminated by the information processing apparatus embodying the disclosure and which draws the user's attention within the image, in interlocked relation with the information processing apparatus.

It is to be understood that while the disclosure has been described in conjunction with specific embodiments with reference to the accompanying drawings, it is evident that many alternatives, modifications and variations will become apparent to those skilled in the art in light of the foregoing description. Accordingly, it is intended that the present disclosure embrace all such alternatives, modifications and variations as fall within the spirit and scope of the appended claims.

For example, the information processing apparatus 100 embodying the present disclosure may be furnished individually with the detection section 120, discrimination section 122, and processing section 124 shown in FIGS. 7 and 9 (e.g., each portion may be implemented with a separate processing circuit).

Whereas the foregoing description has referred to the provision of the programs (computer programs) for causing the computer to implement the information processing apparatus embodying the present disclosure, a recording medium storing these programs may also be offered as an embodiment of this disclosure.

It is to be noted that the examples in the preceding paragraphs are merely specificities that also fall within the spirit and scope of the appended claims.

What is claimed is:

1. An information processing apparatus comprising:
a discrimination section configured to discriminate an object drawing the line of sight of a user viewing an image displayed on a display screen, the discrimination being based both on coordinate information indicative of where the line of sight of said user is positioned relative to said image and on object information including area information indicative of an image area including said object in said image,
wherein said object information is obtained based on a histogram which is calculated for feature quantities corresponding to said image area; and
a processing section configured such that when said discrimination section discriminates said object drawing the line of sight of said user, said processing section selectively performs a process corresponding to said object discriminated by said discrimination section,
wherein said processing section is configured to perform an expansion process for expanding said image area corresponding to said object discriminated by said discrimination section to form a three dimensional image.

2. The information processing apparatus according to claim 1, further comprising
a detection section configured to detect said object included in said image so as to generate said object information, by utilizing metadata associated with said image and/or by processing said image,
wherein said discrimination section determines said object drawing the line of sight of said user based on said object information generated by said detection section.

3. The information processing apparatus according to claim 1, wherein said processing section provides a display of auxiliary information about said object discriminated by said discrimination section, said display being positioned near said image area corresponding to said object discriminated by said discrimination section.

4. The information processing apparatus according to claim 3, further comprising:
a storage portion; and
a communication portion configured to communicate with an external apparatus storing said auxiliary information,
wherein said processing section generates attention-drawing object information indicative of said object discriminated by said discrimination section, before recording the generated attention-drawing object information to said storage portion, if said attention-drawing object information corresponding to said object discriminated by said discrimination section is stored in said storage portion, then said processing section acquires said auxiliary information corresponding to said attention-drawing object information from said external apparatus via said communication portion, and wherein said processing section displays said acquired auxiliary information near said image area which is part of said image and which corresponds to said object discriminated by said discrimination section.

5. The information processing apparatus according to claim 1, further comprising a communication portion configured to communicate with an external apparatus, wherein said processing section generates attention-drawing object information indicative of said object discriminated by said discrimination section, before causing said communication portion to transmit said generated attention-drawing object information to said external apparatus.

6. The information processing apparatus according to claim 1, wherein said processing section performs an extended definition process for enhancing image quality of said image area corresponding to said object discriminated by said discrimination section.

7. The information processing apparatus according to claim 1, wherein said processing section prevents any image different from said image and/or what is indicated by any information unrelated to said image from being displayed in superposed fashion on said image area corresponding to said object discriminated by said discrimination section.

8. The information processing apparatus according to claim 1, further comprising an input portion configured to admit said coordinate information generated by and input from an imaging device through detection of the line of sight of said user relative to said image displayed on said display screen of a display device, wherein, based on said coordinate information input to said input portion, said discrimination section discriminates said object drawing the line of sight of said user.

9. The information processing apparatus according to claim 1, further comprising:

a display portion configured to display said image on said display screen; and an imaging portion configured to generate said coordinate information by detecting the line of sight of said user relative to said image displayed on said display screen of said display portion, wherein, based on said coordinate information generated by said imaging portion, said discrimination section discriminates said object drawing the line of sight of said user.

10. The information processing apparatus according to claim 1, wherein said discrimination section is configured to discriminate each of a plurality of objects drawing the corresponding line of sight of each of a plurality of users viewing said image.

11. The information processing system according to claim 1, wherein said histogram is calculated for said feature points corresponding to binary patterns in said image area.

12. An information processing system comprising:

a server configured to store auxiliary information about a plurality of objects; and an information processing apparatus configured to communicate with said server, wherein said information processing apparatus includes:

a storage portion, a communication portion configured to communicate with said server, a discrimination section configured to discriminate each of the plurality of objects drawing the corresponding line of sight of each of a plurality of users viewing an image displayed on a display screen, the discrimination being based both on coordinate information indicative of where the corresponding line of sight of each of said plurality of users is positioned relative to said image and on object information including area information indicative of a corresponding image area including each of said plurality of objects in said image, wherein said object information is obtained based on a histogram which is calculated for feature quantities corresponding to said image area; and a processing section configured such that when said discrimination section discriminates each of said plurality of objects drawing the corresponding line of sight of each of said plurality of users, said processing section selectively performs a process corresponding to each of said plurality of objects discriminated by said discrimination section, said processing section generates attention-drawing object information indicative of each of said plurality of objects discriminated by said discrimination section, before recording said generated attention-drawing object information to said storage portion, if said attention-drawing object information corresponding to each of said plurality of objects discriminated by said discrimination section is stored in said storage portion, then said processing section acquires said auxiliary information corresponding to said attention-drawing object information from said server via said communication portion, and wherein said processing section displays said acquired auxiliary information near said image area corresponding to each of said plurality of objects discriminated by said discrimination section.

13. An information processing system comprising:

a server; and an information processing apparatus configured to communicate with said server, wherein said information processing apparatus includes:

a communication portion configured to communicate with said server;

a discrimination section configured to discriminate an object drawing the line of sight of a user viewing an image displayed on a display screen, the discrimination being based both on coordinate information indicative of where the line of sight of said user is positioned relative to said image and on object information including area information indicative of an image area including said object in said image, wherein said object information is obtained based on a histogram which is calculated for feature quantities corresponding to said image area; and a processing section configured such that when said discrimination section discriminates said object drawing the line of sight of said user, said processing section selectively performs a process corresponding to said object discriminated by said discrimination section, said processing section generates attention-drawing object information indicative of said object discriminated by said discrimination section, before causing said communication portion to transmit said generated attention-drawing object information to said server, wherein said processing section is configured to perform an expansion process for expanding said image area corresponding to said object discriminated by said discrimination section to form a three dimensional image.

14. The information processing system according to claim 13, wherein said discrimination section is configured to discriminate each of a plurality of objects drawing the corresponding line of sight of each of a plurality of users viewing said image.

15. The information processing system according to claim 12, wherein said processing section is configured to perform an expansion process for expanding said image area corresponding to said object discriminated by said discrimination section to form a three dimensional image.

* * * * *